United States Patent
Claussen et al.

(10) Patent No.: US 12,534,115 B1
(45) Date of Patent: *Jan. 27, 2026

(54) BATTERY POWERED LOCOMOTIVE

(71) Applicant: Knoxville Locomotive Works, Inc., Knoxville, TN (US)

(72) Inventors: Pete Claussen, Knoxville, TN (US); Scott Gatewood, Knoxville, TN (US); Michael Thomason, Knoxville, TN (US); Todd Burchette, Knoxville, TN (US)

(73) Assignee: Knoxville Locomotive Works, Inc., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/350,306

(22) Filed: Oct. 6, 2025

Related U.S. Application Data

(63) Continuation-in-part of application No. 19/245,486, filed on Jun. 23, 2025, now Pat. No. 12,466,447, which is a continuation of application No. 19/188,285, filed on Apr. 24, 2025, now Pat. No. 12,365,367.

(60) Provisional application No. 63/721,099, filed on Nov. 15, 2024.

(51) Int. Cl.
| | |
|---|---|
| *B61C 17/06* | (2006.01) |
| *B60L 50/52* | (2019.01) |
| *B61C 9/38* | (2006.01) |
| *B61H 9/06* | (2006.01) |
| *H02J 1/14* | (2006.01) |
| *H02J 7/14* | (2006.01) |
| *H02P 3/14* | (2006.01) |

(52) U.S. Cl.
CPC .............. *B61C 17/06* (2013.01); *B60L 50/52* (2019.02); *B61C 9/38* (2013.01); *B61H 9/06* (2013.01); *H02J 1/14* (2013.01); *H02J 7/1423* (2013.01); *H02P 3/14* (2013.01); *B60L 2200/26* (2013.01)

(58) Field of Classification Search
CPC . B61C 9/38; B61C 17/06; B60L 50/52; B60L 2200/26; B61H 9/06; H02J 1/14; H02P 3/14

See application file for complete search history.

(56) References Cited

U.S. PATENT DOCUMENTS 12,446,447 B2 * 10/2025 Lee ..................... H10K 59/8792

* cited by examiner

*Primary Examiner* — Robert J McCarry, Jr.
(74) *Attorney, Agent, or Firm* — Luedeka Neely P.C.

(57) ABSTRACT

A locomotive has a power bus that provides power to components of the locomotive when operating in a motoring mode or a charging mode. A plurality of batteries, one or more traction motors, and a charging source are all connected to the power bus. The batteries are operable to provide power to the power bus when operating in the motoring mode, and to receive power from the power bus when operating in the charging mode. The traction motors are operable to receive power from the power bus when the locomotive is operating in the motoring mode. The charging source intermittently provides charging power to the power bus to charge the batteries when the locomotive is operating in the motoring mode or in the charging mode. The charging source is selectively activated and deactivated based at least in part on the state of charge of the batteries.

20 Claims, 11 Drawing Sheets

BATTERY POWERED LOCOMOTIVE

FIELD

This disclosure relates to the field of locomotives. More particularly, the disclosure relates to battery powered locomotives that do not have a prime mover engine.

BACKGROUND

Improvement is desired in construction and operation of locomotives. What is desired is a locomotive system configured to improve fuel economy, reduce emissions, and lower operational costs.

The present disclosure advantageously provides a battery powered locomotive that does not have a prime mover engine. As used herein, the term "prime mover engine" refers to an engine having a power output of at least about 1000 horsepower as is equal to the power required for the traction motors of the locomotive to cause continuous movement of the locomotive when operating in a motoring mode, which is an operational mode in which the traction motors of the locomotive cause the wheels of the locomotive to continuously turn throughout the operational speed of the locomotive, which is generally up to at least about 60 mph.

The only fuel requirements of preferred embodiments of the locomotive is the fuel required to run a battery charging source, such as a small gas/diesel generator that is used solely for charging on-board batteries. The on-board batteries provide all electrical power requirements of the locomotive.

SUMMARY

The above and other needs are met by improved battery powered locomotives and battery powered locomotive consists. In one aspect, a battery powered locomotive according to the disclosure includes a power bus, one or more traction motors, batteries, a charging source, and a power dissipation device. In alternative embodiments, the power bus may be a DC bus or an AC bus. The power bus provides a voltage to components of the locomotive when the locomotive is operating in a motoring mode, a charging mode, or a dynamic braking mode. The batteries are connected across the power bus for providing power to the power bus when the locomotive is operating in the motoring mode, and for receiving power from the power bus when the locomotive is operating in the charging mode and the dynamic braking mode. Each traction motor comprises an armature winding and a field winding that are selectively connected in parallel across the power bus. The traction motors are operable to receive power from the power bus when the locomotive is operating in the motoring mode, to provide charging power to the batteries when the locomotive is operating in the dynamic braking mode, and to receive no power from the power bus when the locomotive is operating in the charging mode. The charging source is connected across the power bus for providing charging power to the plurality of batteries. The charging power provided by the charging source is less than the total power required by the one or more traction motors when the locomotive is operating in the motoring mode. The power dissipation device is selectively connected across the power bus for receiving and dissipating excess power from the power bus when the locomotive is operating in the dynamic braking mode.

A preferred embodiment described herein is directed to a locomotive having a power bus that is operable to provide power to components of the locomotive when the locomotive is operating in a motoring mode or a charging mode, and a plurality of batteries, one or more traction motors, and a charging source, all connected to the power bus. The plurality of batteries are operable to provide power to the power bus when the locomotive is operating in the motoring mode, and to receive power from the power bus when the locomotive is operating in the charging mode. The status of the plurality of batteries is indicated by a state of charge of one or more of the plurality of batteries. The one or more traction motors are operable to receive power from the power bus when the locomotive is operating in the motoring mode. The charging source is operable to intermittently provide charging power to the power bus to charge the plurality of batteries when the locomotive is operating in the motoring mode or in the charging mode, wherein the charging source is selectively activated and deactivated based at least in part on the state of charge of one or more of the plurality of batteries.

In some embodiments, the power bus is further operable to provide power to components of the locomotive when the locomotive is operating in a dynamic braking mode, the one or more traction motors are further operable to provide charging power to the power bus when the locomotive is operating in the dynamic braking mode, and the plurality of batteries are further operable to receive charging power from the power bus when the locomotive is operating in the dynamic braking mode. A power dissipation device, which is selectively connected across the power bus, is operable to receive and dissipate excess power from the power bus when the locomotive is operating in the dynamic braking mode.

In some embodiments, the charging source further comprises a generator powered by an engine that is operable to be started or stopped based on the state of charge of one or more of the plurality of batteries.

In some embodiments, the charging source further comprises a hydrogen fuel cell that is operable to be started up or shut down based on the state of charge of one or more of the plurality of batteries.

In some embodiments, the locomotive includes a controller that:
  receives a state of charge indication that indicates the state of charge of one or more of the plurality of batteries;
  generates a first control signal to activate the charging source based on the state of charge indication being less than or equal to a first state of charge threshold when the locomotive is operating in the motoring mode; and
  generates a second control signal to deactivate the charging source based on the state of charge indication being greater than or equal to a second state of charge threshold when the locomotive is operating in the motoring mode, wherein the second state of charge threshold is greater than the first state of charge threshold.

In some embodiments, the controller also:
  generates a third control signal to activate the charging source based on the state of charge indication being less than or equal to a third state of charge threshold when the locomotive is operating in the charging mode; and
  generates a fourth control signal to deactivate the charging source based on the state of charge indication being greater than or equal to a fourth state of charge threshold when the locomotive is operating in the charging mode,
wherein the third state of charge threshold is greater than the first state of charge threshold, and the fourth state of charge threshold is greater than the second state of charge threshold.

In some embodiments, the first state of charge threshold is 50%, the second state of charge threshold is 80%, the third state of charge threshold is 95%, and the fourth state of charge threshold is 100%.

In some embodiments, the locomotive transitions from operating in the motoring mode to operating in the charging mode based on the axle speed of the locomotive changing from non-zero to zero, and remaining at zero for at least a first threshold time.

In some embodiments, a ratio of traction motor mechanical power provided by the one or more traction motors to the charging power of the charging source ranges from about 4:1 to 5:1.

In some embodiments, the traction motor mechanical power is 3200 horsepower (2386 kilowatts), the charging power is 804 horsepower (600 kilowatts), and the ratio of traction motor mechanical power to the charging power is about 4:1.

In some embodiments, no charging power is provided to the power bus from a power source that is external to the locomotive when the locomotive is operating in the motoring mode or when the locomotive is operating in the charging mode.

Another preferred embodiment is directed to a locomotive having a power bus that is operable to provide power to components of the locomotive when the locomotive is operating in a motoring mode or a charging mode, a plurality of batteries connected to the power bus, one or more traction motors connected to the power bus, and a charging source connected to the power bus. The plurality of batteries are operable to provide power to the power bus when the locomotive is operating in the motoring mode, and to receive power from the power bus when the locomotive is operating in the charging mode. The one or more traction motors are operable to receive electrical power from the power bus and to provide traction motor mechanical power to axles of the locomotive to cause movement of the locomotive in the motoring mode. The charging source is operable to intermittently provide charging power to the power bus to charge the plurality of batteries when the locomotive is operating in the motoring mode, wherein a ratio of the traction motor mechanical power to the charging power ranges from about 4:1 to 5:1.

In some embodiments, the charging source is selectively activated and deactivated based at least in part on a state of charge of one or more of the plurality of batteries.

Yet another preferred embodiment is directed to a locomotive having a power bus that is operable to provide power to components of the locomotive when the locomotive is operating in a motoring mode or a charging mode, a plurality of batteries connected to the power bus, one or more traction motors connected to the power bus, and a charging source connected to the power bus. The plurality of batteries are operable to provide power to the power bus when the locomotive is operating in the motoring mode, and to receive power from the power bus when the locomotive is operating in the charging mode. The one or more traction motors are operable to receive electrical power from the power bus and to provide traction motor mechanical power to axles of the locomotive to cause movement of the locomotive in the motoring mode. The charging source is operable to intermittently provide charging power to the power bus to charge the plurality of batteries when the locomotive is operating in the motoring mode and when the locomotive is operating in the charging mode, and no charging power is provided to the power bus from a power source that is external to the locomotive when the locomotive is operating in the motoring mode or when the locomotive is operating in the charging mode.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
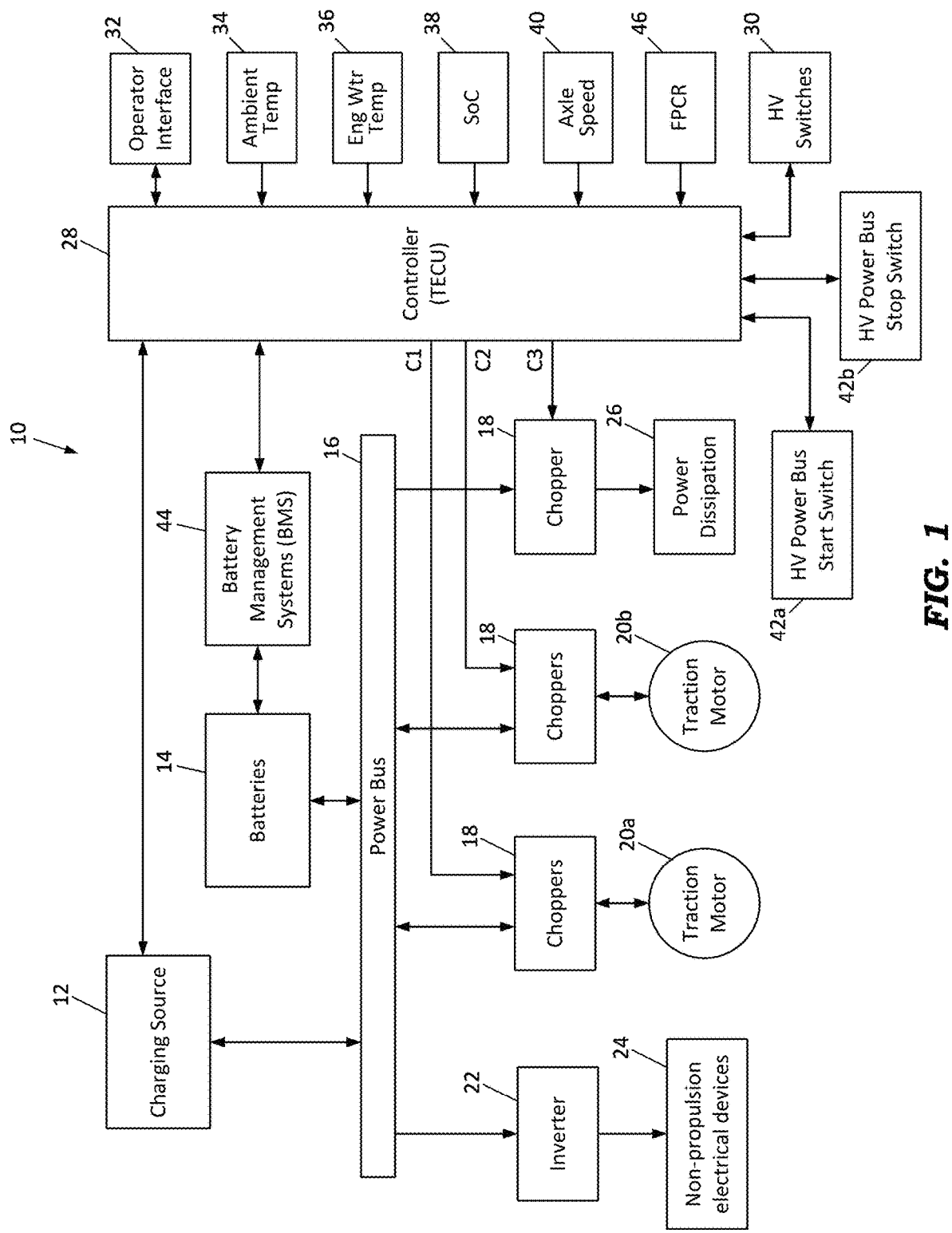
FIG. 1 is a functional block diagram of a battery powered locomotive according to the disclosure.

With reference to FIG. 1, a functional block diagram of a preferred embodiment of a battery powered freight locomotive 10 is shown. The locomotive 10 may have a weight ranging from about 120-213 tons, and typically operates at speeds up to about 60 mph. The locomotive 10 may be connected to haul conventional non-powered railcars (as well as additional battery powered locomotives) to provide a battery powered consist. A train consist having more than one of the locomotives 10 will be understood to be able to haul more weight as a multiple of the capabilities of one of the locomotives 10.

As shown in FIG. 1, components of the locomotive 10 include a battery charging source 12, batteries 14, a power bus 16, chopper circuits 18, traction motors 20, an auxiliary inverter 22, non-propulsion electrical devices 24, a power dissipation device 26, Battery Management Systems (BMS's) 44, and a controller 28 that receives sensor information from an ambient temperature sensor 34, a water temperature sensor 36, a battery state of charge (SoC) sensor 38, an axle speed sensor 40, and a fuel pump control relay (FPCR) state sensor 46. The controller 28, which is also referred to herein as a traction engine control unit (TECU), controls the state of various high-power switches 30 that direct power to/from the power bus 16 from/to the traction motors 20. The controller 28 also receives switch state information from a high-voltage (HV) bus start switch 42a and an HV bus stop switch 42b, and provides information to and receives information from an operator interface device 32, which may be a touch-sensitive display device. In a preferred embodiment, the start/stop switches 42a-42b are operated by a crew member to start or stop the HV power bus 16.

One component that the locomotive 10 does not include is a prime mover engine. As noted previously, the term "prime mover engine" refers to a locomotive engine having a power output of at least about 1000 horsepower as is equal to the power required for the traction motors of the locomotive to cause continuous movement of the locomotive when operating in a motoring mode. As the term is used herein, "motoring mode" is an operational mode in which the traction motors of the locomotive cause the wheels of the locomotive to continuously turn throughout the operational speed of the locomotive, which is generally up to at least about 60 mph. A typical prime mover engine for a heavy duty freight locomotive has an output power ranging from a minimum of about 1006 horsepower (745 kilowatts) and up to 6000 horsepower (4474 kilowatts) or more, depending on the size of the freight locomotive and its proposed use. Also, a prime mover engine must run continuously to provide power to the traction motors while the typical locomotive is operating in the motoring mode. In contrast, the battery charging source 12 described herein does not need to run continuously to provide power to the traction motors while the locomotive is operating in the motoring mode. Rather, the battery charging source 12 operates only when needed to keep the state of charge (SoC) of the batteries 14 within a desired range.

The charging source 12 of the locomotive 10 is preferably a generator/rectifier powered by a relatively small gas/diesel-fueled engine. In an alternative embodiment, the charging source 12 is a hydrogen fuel cell. In its role as a battery charger, the charging source 12 generates no more than about 700-850 horsepower (520-630 kilowatts). This is significantly lower than the power provided by even the smallest prime mover engine used on a heavy duty freight locomotive. Thus, because the battery charging source 12 of the locomotive 10 provides less power than the total power required by the traction motors to continuously power the locomotive 10 when operating in the motoring mode, the battery charging source 12 is not a prime mover engine.

In preferred embodiments, the batteries 14 are lithium ion batteries or lithium iron phosphate batteries. However, it will be appreciated that the invention is not limited to any particular battery chemistry. In one preferred embodiment, each of the batteries 14 has a nominal voltage of about 348 VDC, and multiple pairs of series-connected batteries 14 provide a nominal voltage of about 750 VDC to the power bus 16.

In a preferred embodiment, there is a Battery Management System (BMS) 44 for each bank of the batteries 14. Each BMS 44 comprises an electronic control unit that monitors, protects, and optimizes the performance of the bank of batteries 14 to which it is assigned. The BMS 44 ensures safe and efficient operation by managing charging and discharging, preventing overcharging and deep discharging, and monitoring battery health parameters like voltage, temperature, and state of charge (SoC).

The bus 16 is an electrical power bus that provides a stable voltage output from the batteries 14 to various electrical components of the locomotive 10. In a preferred embodiment, the power bus 16 includes an auxiliary bus 16a, a battery bus 16b, and a traction bus 16c, as described in more detail hereinafter. The bus 16 is desirably configured to maintain a voltage level of about 530 to 800 VDC.

In a preferred embodiment, the chopper circuits 18 are DC-to-DC converters that step up and step down DC power as needed by switching the voltages at their outputs on and off at a rate determined by control signals provided by the controller 28. In a preferred embodiment, the controller 28 generates the control signals based on voltage, current, speed, or torque requests from the locomotive's throttle control. Thus, the chopper circuits 18 control the power supplied by the bus 16 to the traction motors 20 to provide the desired voltage, current, speed, or torque levels as needed for locomotive operation. Generally, the variation in output voltage provided by the chopper circuits 18 ranges from 0 VDC to 1100 VDC.

In alternative embodiments, the chopper circuits 18 are DC-to-AC chopper/inverters that step AC power up or down as needed. In these embodiments, the chopper circuits 18 may receive DC power from the bus 16 and provide AC power to AC traction motors 20.

In a preferred embodiment, the traction motors 20 are DC motors having armature and field windings that are separately-excited and connected in parallel across the bus 16. In alternative embodiments, the traction motors 20 are AC motors that receive AC current through one or more power inverters connected across the bus 16.

For embodiments having a DC power bus, the auxiliary inverter 22 converts DC to AC for powering the non-propulsion electrical devices 24. The non-propulsion electrical devices 24 include cooling fans, traction motor blowers, inertial motors and air compressors. The non-propulsion devices 24 can require the equivalent of up to 300 horsepower or more to operate.

The traction motors 20 and all of the non-propulsion electrical devices 24 are powered by the batteries 14. Thus, the locomotive 10 has no need to be connected to an external electrical power source for operating in the motoring mode or the trickle charge mode. However, while at rest at a shore location, the locomotive 10 may be connected to shore electrical power to maintain battery charge levels while the non-propulsion devices 24 are operating and drawing power.

The controller 28 generates switching control signals to control various high-power switches 30 as described hereinafter. The controller 28 also generates the control signals C1, C2, and C3 that determine the output power provided by the chopper circuits 18 in DC traction motor embodiments. In AC traction motor embodiments, the controller 28 generates the control signals C1, C2, and C3 that determine the output power provided by the chopper/inverter circuits.

As described in more detail hereinafter, the locomotive 10 is operative in at least three modes, including a motoring mode, a dynamic braking mode, and a battery charging mode (also referred to herein as a trickle charge mode). Some embodiments may also operate in a coasting mode.

Figure 2:
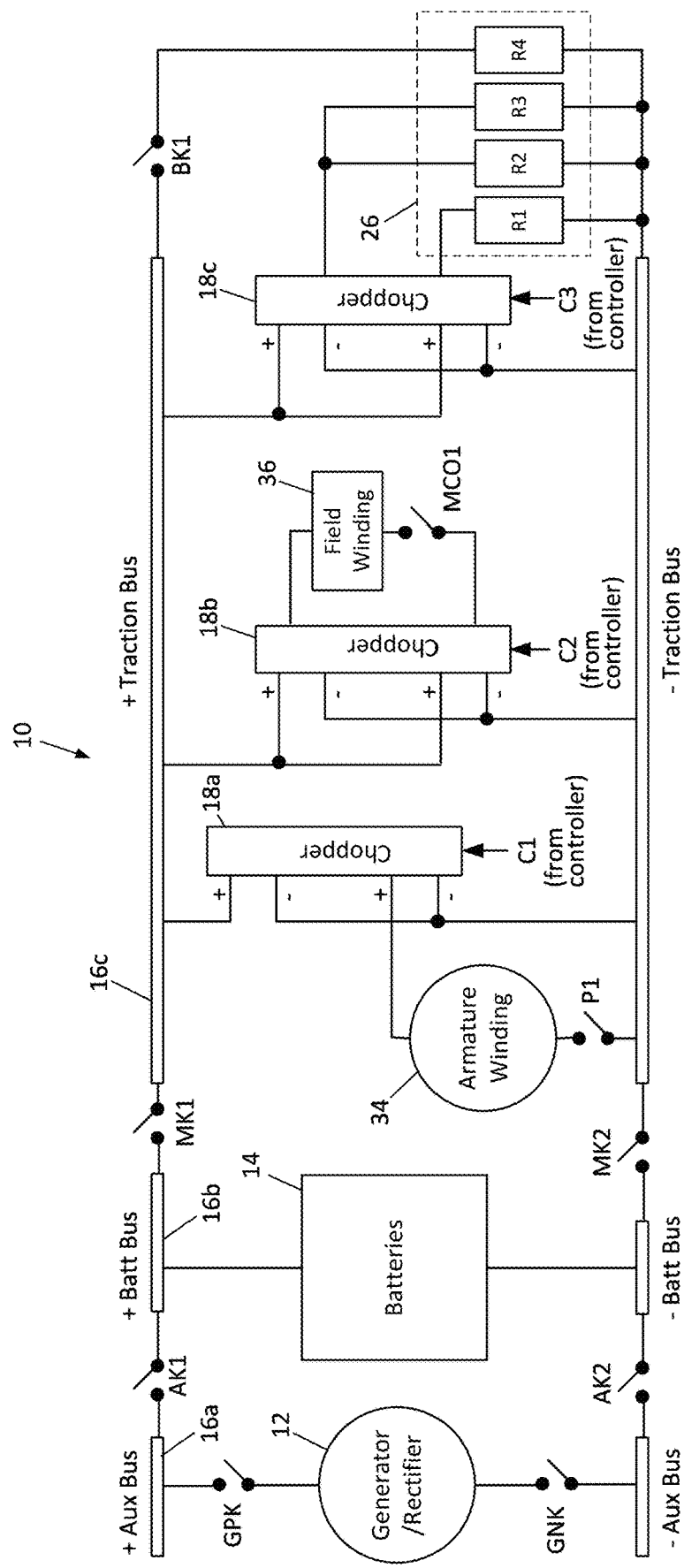
FIG. 2 is a schematic diagram of the battery powered locomotive.

In some embodiments, the battery charging source 12 may comprise a generator/rectifier powered by a diesel or gasoline engine. As shown in the schematic diagram of FIG. 2, the battery charging source 12 is connected across the positive and negative terminals of the auxiliary bus 16a through the switches GPK and GNK. In a preferred embodiment, the charging source 12 generates a maximum voltage of about 600 VAC that the rectifier converts to a maximum of about 840 VDC. Thus, when the switches GPK and GNK are closed, the charging source 12 provides at least about 750-800 VDC across the auxiliary bus 16a. To enhance the simplicity of the description, FIG. 2 depicts only the chopper circuits 18*a* and 18*b* that provide power to one traction motor 20*a*. Each of the other traction motors, such as traction motor 20*b*, are provided power by other dedicated chopper circuits that are connected to the traction bus 16*c* in the same manner as chopper circuits 18*a*-18*b*.

With continued reference to FIG. 2, the batteries 14 are connected across the positive and negative terminals of the battery bus 16*b*, wherein the positive terminal of the battery bus 16*b* is selectively connected to the positive terminal of the auxiliary bus 16*a* through the switch AK1, and the negative terminal of the battery bus 16*b* is selectively connected to the negative terminal of the auxiliary bus 16*a* through the switch AK2. In a preferred embodiment, depending on charge levels, the batteries 14 provide about 530 to 800 VDC across the battery bus 16*b*.

As also shown in FIG. 2, the chopper circuits 18*a*, 18*b*, and 18*c* are connected across the positive and negative terminals of the traction bus 16*c*, wherein the positive terminal of the traction bus 16*c* is selectively connected to the positive terminal of the battery bus 16*b* through the switch MK1, and the negative terminal of the traction bus 16*c* is selectively connected to the negative terminal of the battery bus 16*b* through the switch MK2. The chopper circuit 18*a* controls the power provided to the armature winding 34 of the traction motor 20*a*, and the chopper circuit 18*b* controls the power provided to the field winding 36 of the traction motor 20*a*. The chopper circuit 18*c* controls the power provided to the power dissipation device 26, which is a resistor grid in the embodiment of FIG. 2. The resistor grid 26 may include several banks of resistors, such as banks R1, R2, R3, and R4, through which power is selectively dissipated as necessary. In other embodiments, the power dissipation device 26 may comprise a capacitor bank, a flywheel, or other device for dissipating excess power.

Figure 3:
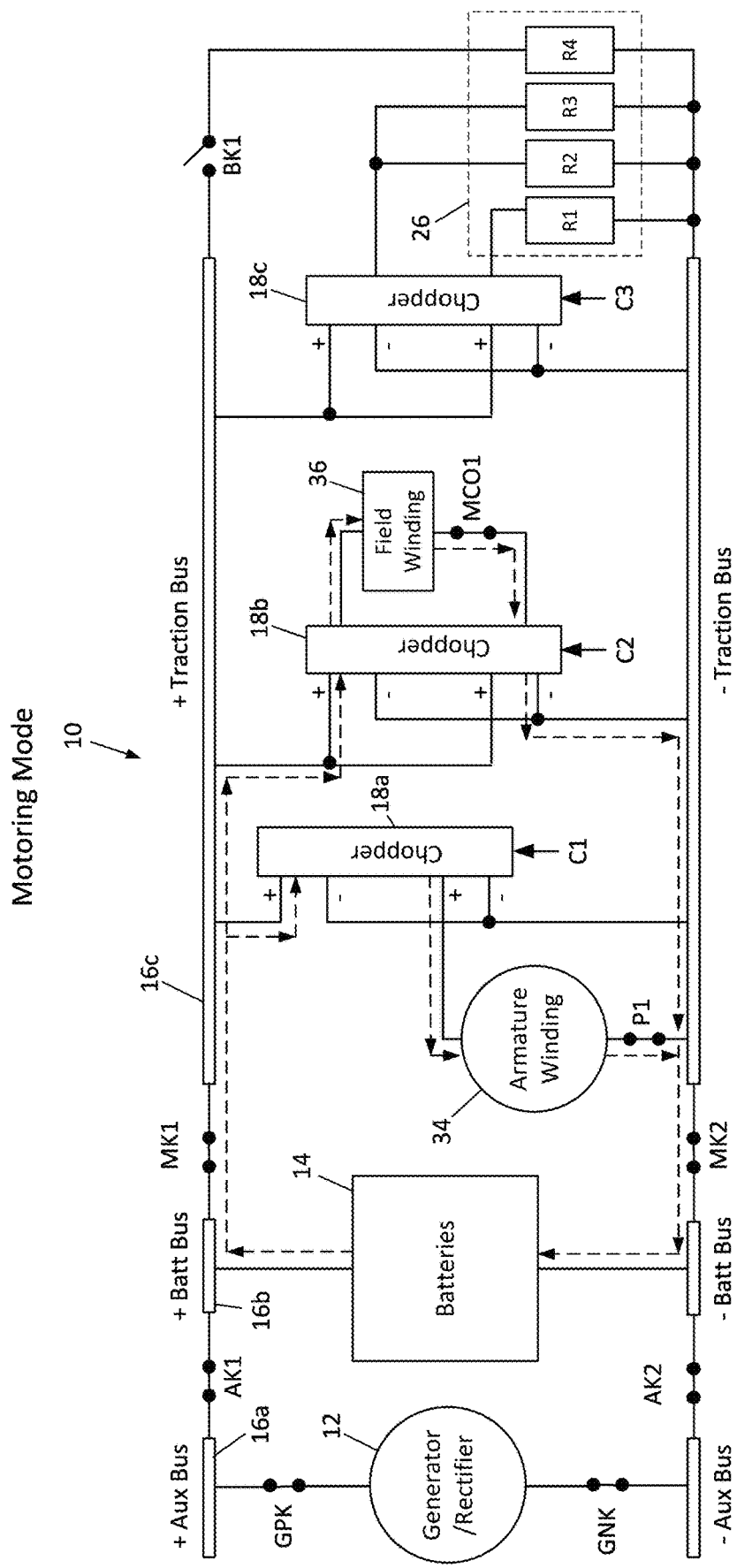
FIG. 3 is a schematic diagram showing electrical power flow when the locomotive is in a motoring mode.

FIG. 3 shows electrical power flow when the locomotive is in the motoring mode, during which power is supplied to the traction motors 20*a*-20*b* for powered movement of the locomotive 10. In the motoring mode, the controller 28 controls the states of the high-power switches 30 to provide power from the battery bus 16*b* to the traction bus 16*c*. The controller 28 also provides the control signals C1 and C2 to the chopper circuits 18*a* and 18*b* to provide the appropriate power levels to the armature winding 34 and field winding 36 of the traction motor 20*a*. As shown in FIG. 3, when motoring, the switches MK1 and MK2 are in a closed state so that the battery bus 16*b* provides power to the traction bus 16*c*. The controller 28 sets the switch P1 to the closed state so that the chopper circuit 18*a* provides power to the armature winding 34 of the traction motor 20*a*, and the chopper circuit 18*b* provides power to the field winding 36 of the traction motor 20*a*. (The switch MC01 maintains a normally-closed state.) In the preferred embodiment, the controller 28 sets control signal C1 to provide power to the armature winding 34 over a range of 0 VDC to 1100 VDC, and sets control signal C2 to provide power to the field winding 36 over a range of 0 VDC to 1100 VDC. Generally, during motoring mode, all available power from the batteries 14 is provided to the traction motors 20, and no power is dissipated in the resistor grid 26.

In a preferred embodiment, the controller 28 generates the following control signals to control the high-voltage switches 30 and operate the traction motors 20 in the motoring mode:

To the chopper circuit 18*a*—a Digital Enable signal, a Digital Power Signal, an analog TM 1-4 Amp/Rpm Limit signal, and a Boost TM 1-4 Volt/Amp Limit signal that depends on the throttle controller handle position; and To the chopper circuit 18*b*—a Digital Enable signal, a Digital Power Signal, a Digital Direction Signal, and an analog TM 1-4 Field Amp Limit signal that depends on the throttle controller handle position.

In a preferred embodiment, the controller 28 generates the following control signals to control the high-voltage switches 30 and operate the traction motors 20 in the coasting mode: a Digital Enable signal, a Digital Direction signal, a Digital Regen signal, an analog TM 1-4 Amp/Rpm Limit signal, an analog TM 1-4 Field Amp Limit signal, and a Grid 1 Volt Limit/Amp Limit signal depending on the SOC percentages of the batteries 14.

In preferred embodiments, the signals C1 and C2 control the chopper circuits 18*a* and 18*b* to provide approximately the same voltage levels across the armature winding 34 and field winding 36 over most of the operational speed range of the locomotive 10. However, at speeds approaching 65 mph, the control signal C2 controls the chopper circuit 18*b* to reduce the current in the field winding 36, while the control signal C1 controls the chopper circuit 18*a* to maintain the current through the armature winding 34. This field weakening is generally performed only with lighter train loads at the higher speeds.

Figure 4:
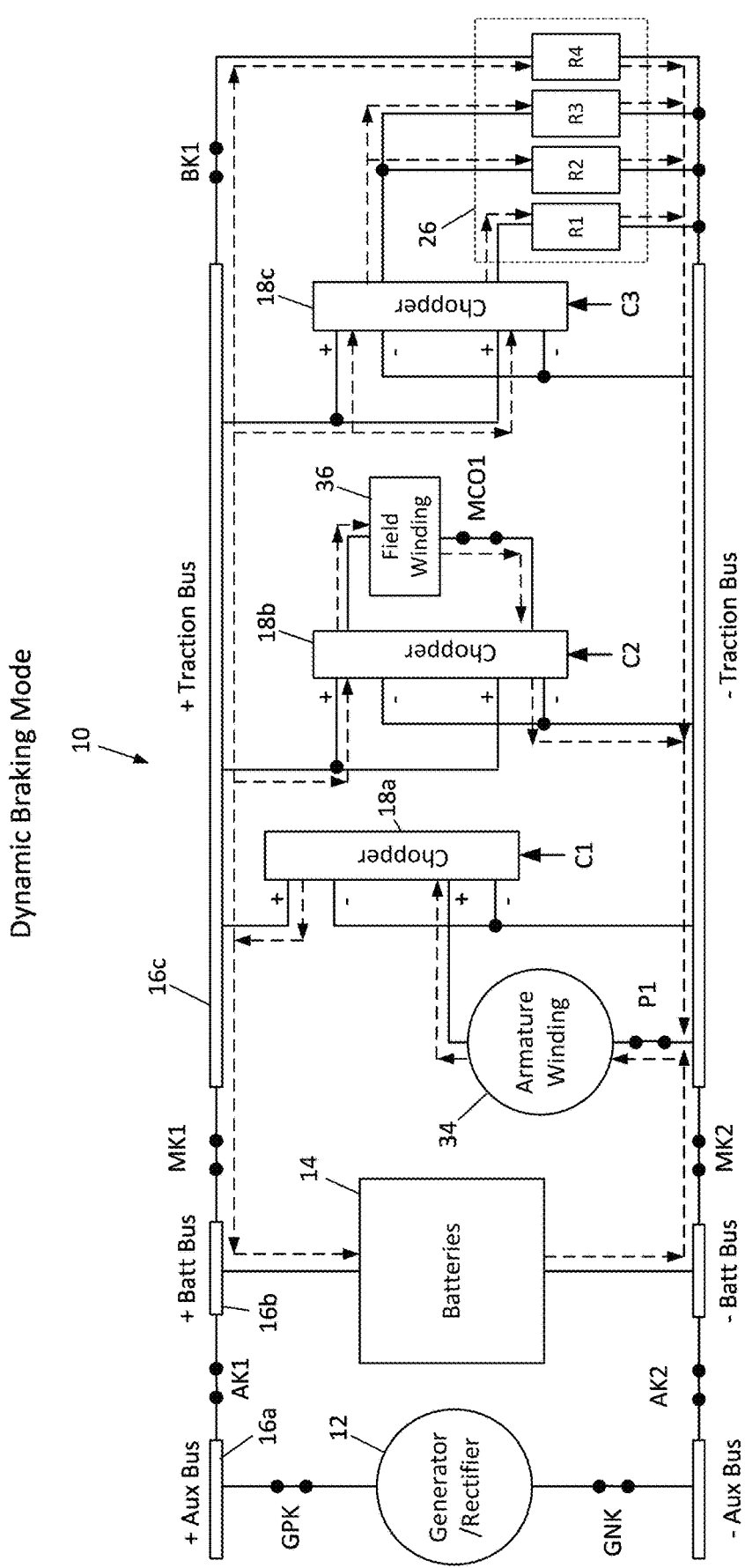
FIG. 4 is a schematic diagram showing electrical power flow when the locomotive is in a dynamic braking mode.

FIG. 4 shows electrical power flow when the locomotive is in the dynamic braking mode. The locomotive 10 utilizes dynamic braking by which the kinetic energy of the moving locomotive 10 is used to cause the traction motors 20 to generate electric current. In the dynamic braking mode, the controller 28 sets the states of the various high-power switches 30 to energize the traction motor windings 34 and 36, thereby causing the traction motors to act as generators. The resistance of the motor field acts as a brake on the locomotive 10, which in turn helps to slow the train. As described in more detail hereinafter, at least some of the electric current generated by the motors 20 in the dynamic braking mode may be used to charge the batteries 14. Current not needed for battery charging may be dissipated as heat in the power dissipation device 26.

With reference to FIG. 4, the controller 28 controls the states of the switches P1, MK1, and MK2 to allow current generated by the armature winding 34 in the dynamic braking mode to flow through the chopper circuit 18*a* to the positive terminal of the traction bus 16*c*, thereby providing power for charging the batteries 14 via the battery bus 16*b*. In preferred embodiments, the charging voltage provided by the armature winding 34 (acting as a generator) may range from 0 to 780 VDC. In dynamic braking mode, the controller 28 also controls the state of the switch BK1 and the control signal C3 to direct excess power not needed for battery charging to the power dissipation device 26. In some embodiments, a coasting mode may be implemented in which the controller 28 controls the chopper 18 to divert power generated by the traction motors 20 to the batteries 14 for charging, and if batteries are fully charged, the controller 28 controls the switch BK1 to allow excess energy to flow to the dissipation device 26.

In a preferred embodiment, the controller 28 generates the following control signals to control the high-voltage switches 30 and to the chopper circuits 18*a* and 18*c* to operate the traction motors 20 in the dynamic breaking mode:

a Digital Enable signal, a Digital Regen signal, a Digital Direction signal, an analog TM 1-4 Amp/RPM Limit signal, an analog TM 1-4 Field Amp Limit signal, and a Grid 1 Volt Limit/Amp Limit signal depending on the dynamic brake controller handle position and the SOC percentages/Top-of-Charge limits of the batteries 14.

Figure 5:
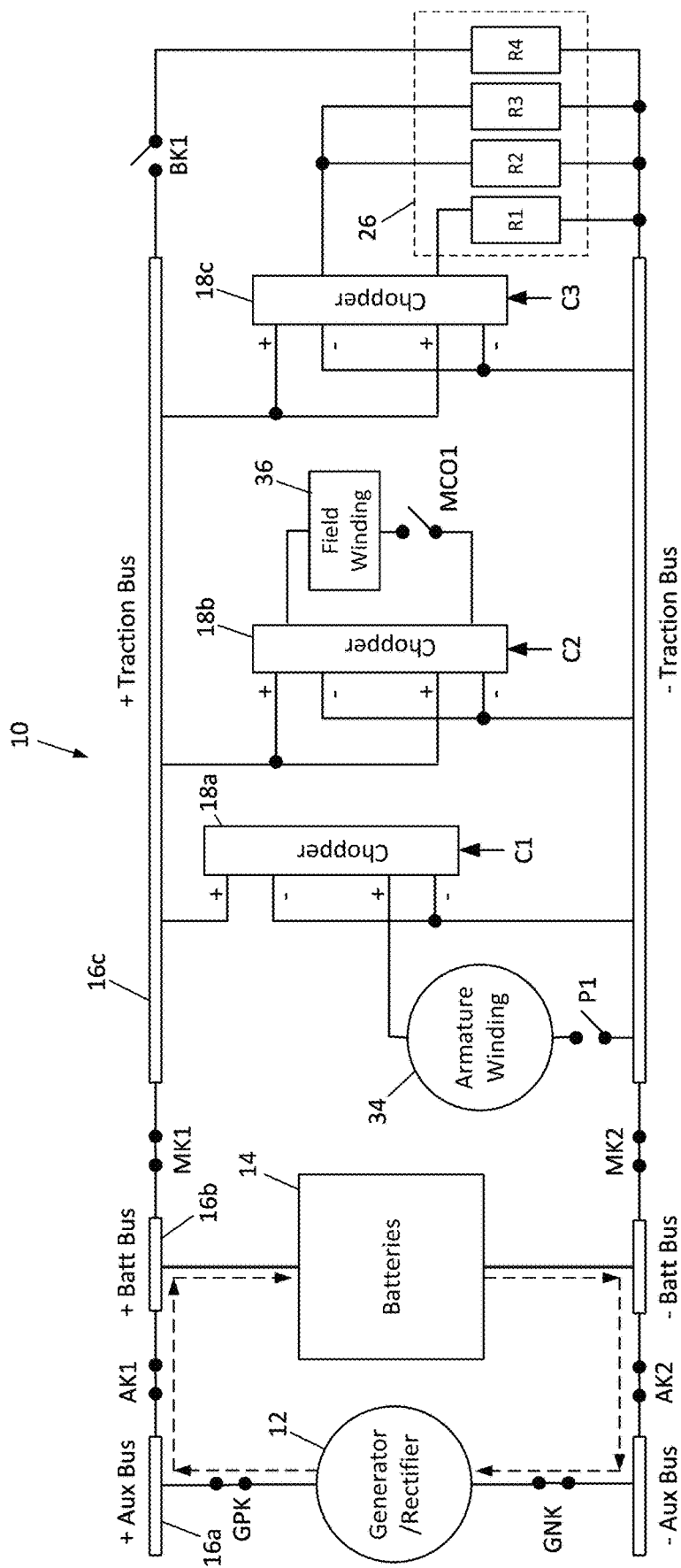
FIG. 5 is a schematic diagram showing electrical power flow when the locomotive is in a battery charging mode (also referred to herein as trickle charge mode)

FIG. 5 shows electrical power flow when the locomotive is in the battery trickle charge mode. In the trickle charge mode, the controller 28 controls the states of the high-power switches 30 to provide power from the auxiliary bus 16a to the battery bus 16b. Specifically, the controller 28 keeps the switches GPK, GNK, AK1, and AK2 in the closed state so that the batteries 14 receive a charging voltage from the charging source 12. In preferred embodiments, the charging voltage provided by the charging source 12 may range from 530 VDC to 800 VDC. When in the trickle charge mode, the charging source 12 charges the batteries 14 while the locomotive is not moving, such as when locomotive is out of service between hauling tasks. Thus, during this mode, the controller 28 sets control signals C1 and C2 so that the chopper circuits 18a-18b provide zero voltage to the armature winding 34 and the field winding 36.

When the voltages on the traction motor windings 34-36 are increased so that the wheels of the locomotive are put in motion, the locomotive transitions into the motoring mode discussed above (FIG. 3), in which the batteries 14 continue to receive a charge from the charging source 12. Thus, during the motoring mode, the batteries 14, the charging source 12, and the traction motor windings 34-36 all remain connected to the DC bus 16, and a non-zero voltage is applied to the traction motor windings 34-36, and the batteries 14 continuously charge and discharge as the desired motoring speed is set by the controller 28.

In a preferred embodiment, the controller 28 generates the following control signals to control the high-voltage switches 30 and operate the traction motors 20 in the coasting mode: a Digital Enable signal, a Digital Direction signal, a Digital Regen signal, an analog TM 1-4 Amp/RPM Limit signal, an analog TM 1-4 Field Amp Limit signal, a Grid 1 Volt Limit/Amp Limit depending on the SOC percentages of the batteries 14.

Crew Operator Switches

As noted above, the start/stop switches 42a-42b are operated by a crew member to start or stop the high-voltage power bus 16. When the start switch 42a is pressed, the fuel pump control relay (FPCR) is activated immediately, wake signals are sent to the BMS units 44, and power is provided to the outputs from the controller 28 that send control signals to the high-power switches 30. When the stop switch 42b is pressed, the FPCR is deactivated immediately, but a delayed-reset relay allows the high-power switches 30 to remain connected to the controller 28 for a short period of time to allow the controller 28 to terminate the flow of power before the switches 30 open.

Controller Bus ON/OFF Logic

Figure 9:
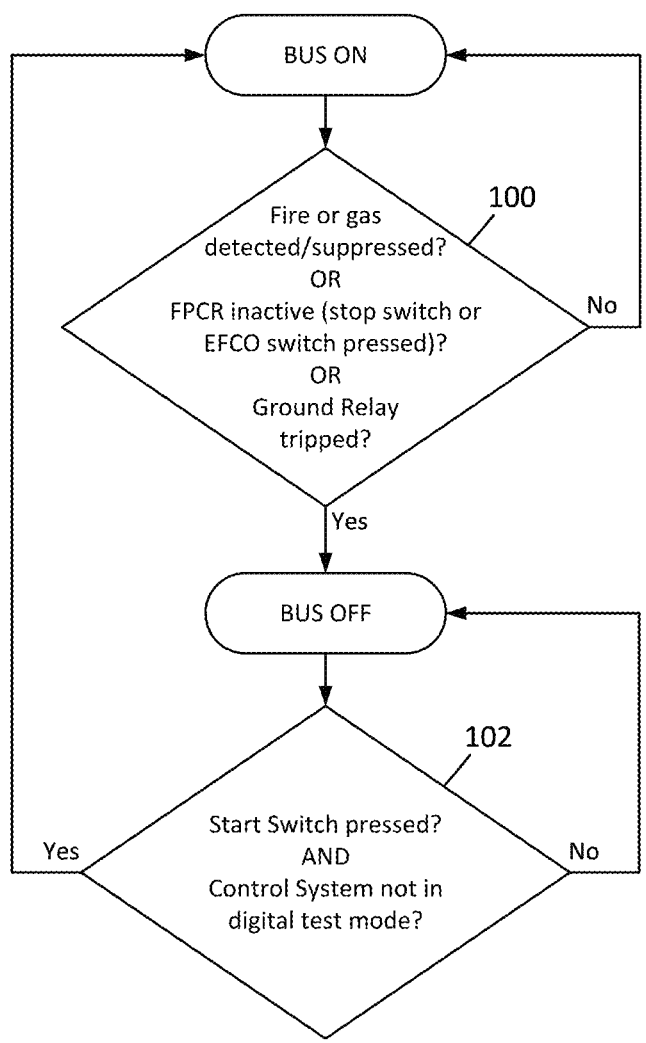
FIG. 9 is a flow diagram of a control system bus on/bus off process according to a preferred embodiment of the battery powered locomotive.

As depicted in FIG. 9, the controller 28 transitions from BUS ON mode to BUS OFF mode when any of the following conditions occurs (step 100 in FIG. 9):
  fire or gas is detected or suppressed; or
  the FPCR is inactive because the stop switch 42b has been pressed or an engine fuel cutoff (EFCO) switch has been pressed; or
  a ground relay has tripped.

The controller 28 transitions to BUS ON mode when the two following conditions coincide (step 102):
  the start switch 42a has been pressed; and
  the controller 28 is not in one of its digital test modes (i.e. contactor test, relay test, or output test).

High-Voltage Power Bus Start Sequence

Figure 6:
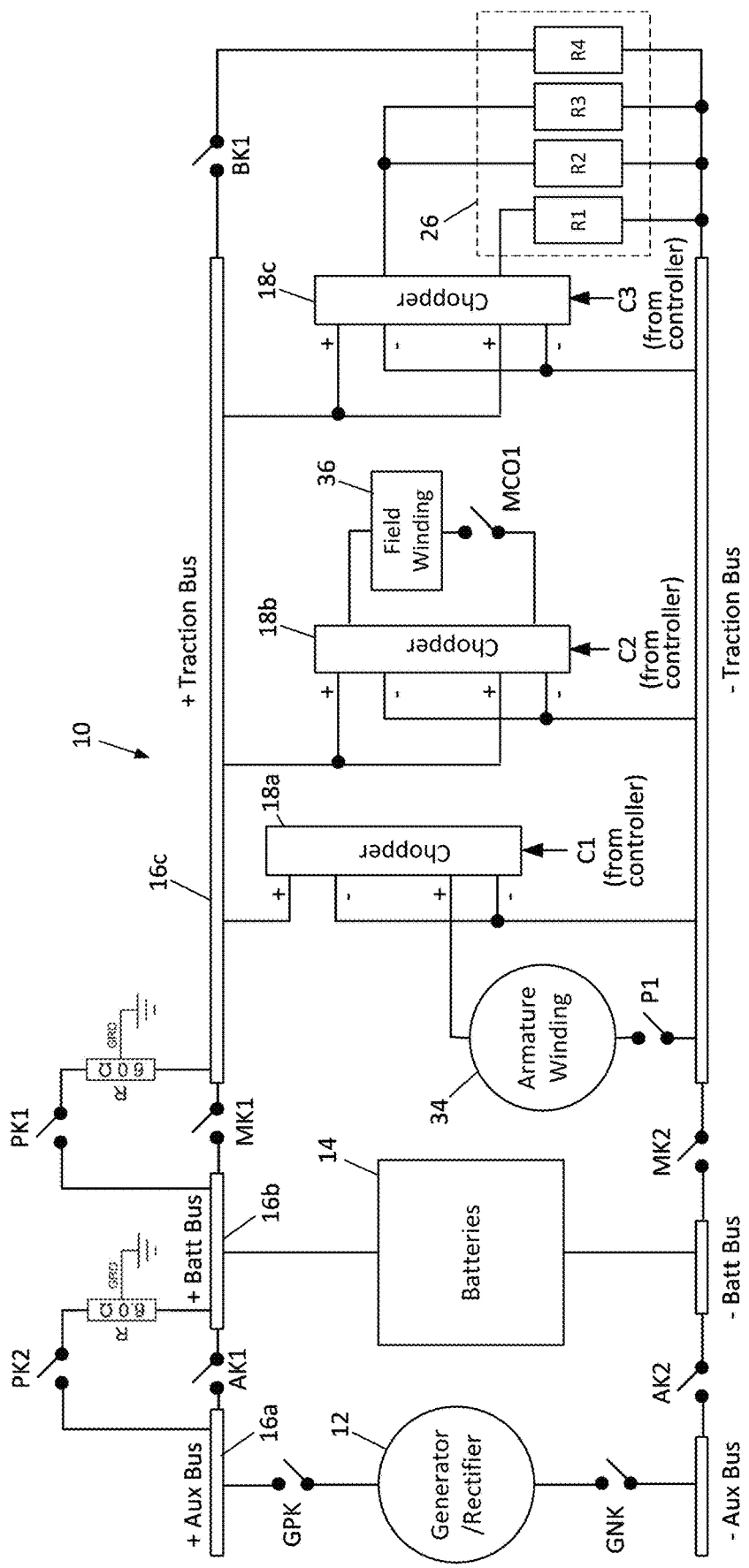
FIG. 6 is a schematic diagram of a preferred embodiment of the battery powered locomotive.
Figure 10:
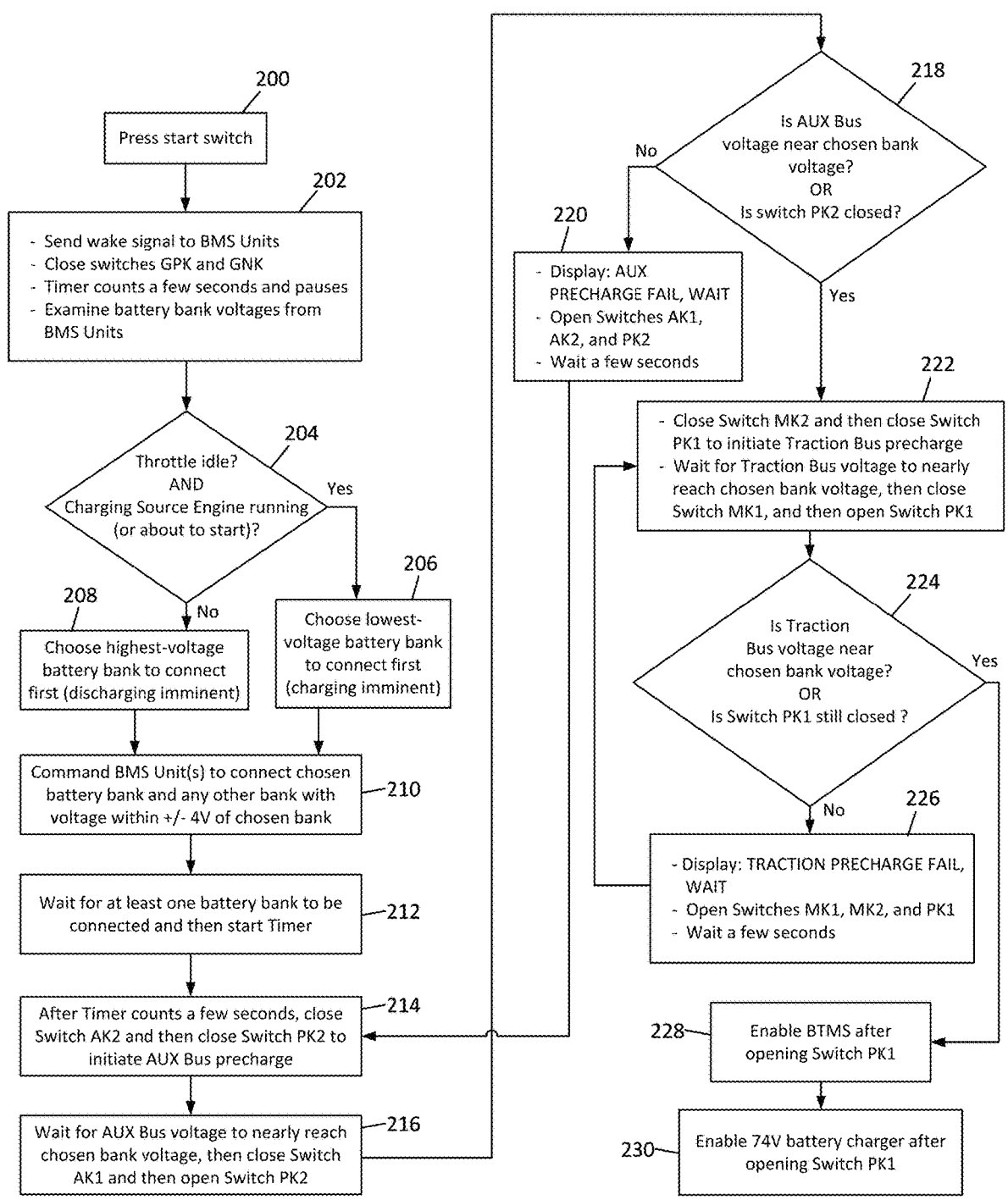
FIG. 10 is a flow diagram of a high-voltage power bus start sequence according to a preferred embodiment of the battery powered locomotive.

As depicted in FIG. 10, the sequence to start the power bus 16 begins when the start switch 42a is pressed (step 200). This activates a startup timer, and causes a wake signal to be immediately sent to the BMS units 44, and the controller 28 immediately sends control signals to cause high-power switches GPK and GNK to close to connect the charging power source 12 to the auxiliary bus (see FIG. 6). A short time after pressing the start switch 42a, the startup timer pauses and the controller 28 examines the battery voltages reported by BMS units 44 to determine which of the four banks of the batteries 14 to connect to the battery bus 16b first (step 202). If the charging source engine throttle is at idle and the engine is running or is about to start due to operator-initiated manual start or auto-start (step 204), then the controller 28 chooses the battery bank having the lowest voltage (imminent charge) to connect first (step 206). Otherwise, the controller 28 chooses the battery bank having the highest voltage (imminent discharge) to connect first (step 208). The controller 28 then commands one or more of the BMS units 44 to connect the battery bank chosen in step 206 or step 208 to the battery bus 16b, along with any other battery bank having a voltage within +/−4V of the chosen bank's voltage (step 210). As long as at least one BMS unit 44 has been commanded to connect, but its battery bank has not yet connected to the battery bus 16b, the startup timer is held. Once each commanded BMS unit 44 has connected at least one battery bank, the startup timer is allowed to continue counting up (step 212).

After the startup timer has counted a short time after all the chosen battery banks have been commanded to connect, the auxiliary bus 16a is allowed to precharge. The precharge sequence begins with the controller 28 sending a control signal to cause high-power switch AK2 to close. After receiving sensor feedback indicating that switch AK2 has closed, the controller 28 sends a control signal to cause high-power switch PK2 to close which begins precharging the auxiliary bus 16a (step 214). Once the voltage on the auxiliary bus 16a has nearly reached the voltage of the bank chosen in step 206 or step 208, the controller 28 sends a control signal to cause the high-power switch AK1 to close. After receiving sensor feedback indicating that switch AK1 has closed, the controller 28 sends a control signal to cause high-power switch PK2 to open, thereby disabling the precharge path (step 216). If the voltage on the auxiliary bus 16a has not nearly reached the voltage of the chosen battery bank after closing the switch AK2, or after closing the switch PK2 (step 218), then "AUX PRECHARGE FAIL, WAIT" is displayed on the operator interface 32, and the controller 28 sends control signals to cause high-power switches AK1, AK2, and PK2 to open and remain open for ten times as long as the switch AK2 was closed (step 220). At the end of this delay, the startup sequence loops back to step 214 to try again.

When precharge and connection of the auxiliary bus 16a is complete, the traction bus 16c is allowed to precharge. This process begins with the controller 28 sending a control signal to cause the high-power switch MK2 to close. After receiving sensor feedback indicating that switch MK2 has closed, the controller 28 sends a control signal to cause high-power switch PK1 to close, which begins the precharge of the traction bus 16c. Once the voltage on the traction bus 16c nearly reaches the chosen bank voltage, the controller 28 sends a control signal to cause high-power switch MK1 to close. After receiving sensor feedback indicating that switch MK1 has closed, the controller 28 sends a control signal to cause high-power switch PK1 to open, thereby disabling the traction bus precharge path (step 222).

If the voltage on the traction bus 16c has not nearly reached the voltage of the chosen battery bank after closing the switch MK2, or after closing the switch PK1 (step 224), then "TRACTION PRECHARGE FAIL, WAIT" is displayed on the operator interface 32, and the controller 28 sends control signals to cause high-power switches MK1, MK2, and PK1 to open and remain open for ten times as long as the switch MK2 was closed (step 226). At the end of this delay, the startup sequence loops back to step 222 to try again.

After high-power switch PK1 is opened to connect the traction bus 16c to the battery bus 16b, the controller 28 enables the battery thermal management system (BTMS) (step 228). After the high-power switch PK1 is opened to connect the traction bus 16c to the battery bus 16b, the controller 28 enables a 74V battery charger (step 230). If a manual engine start is requested by an operator via the operator interface 32, the engine start process is inhibited until after the high-power switch PK1 is opened. The traction enable relay (TER) output is inhibited until after the high-power switch PK1 is opened. An AESS auto-start is not inhibited by failure of the power bus start sequence to connect the batteries 14 or to precharge the auxiliary bus 16a or the traction bus 16c.

High-Voltage Power Bus Stop Sequence

Figure 11:
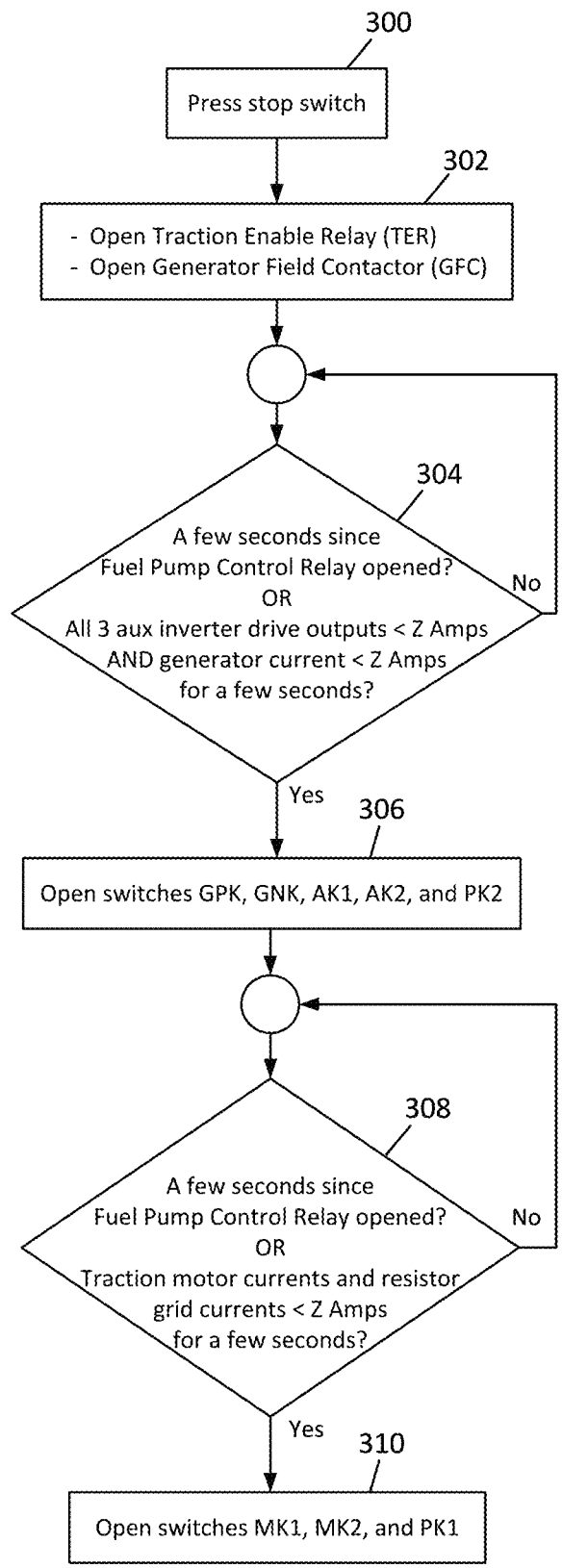
FIG. 11 is a flow diagram of a high-voltage power bus stop sequence according to a preferred embodiment of the battery powered locomotive.

As depicted in FIG. 11, the sequence to stop the power bus 16 begins when the stop switch 42b is pressed (step 300), at which point the controller 28 immediately sends control signals to open the Traction Enable Relay (TER) and the Generator Field Contactor (GFC) (step 302). This begins the process of cutting off any active generator or battery currents. Once a short time has elapsed after opening the Fuel Pump Control Relay (FPCR), or the auxiliary inverter drive output currents are all below a threshold level and the main generator current is the threshold level for a short time (step 304), the controller 28 sends control signals to open the switches GPK, GNK, AK1, AK2, and PK2 (step 306). Once a short time has elapsed after opening the FPCR, or all of the traction motor field and armature winding currents and all of the resistor grid currents have been below the threshold level for a short time (step 308), the controller 28 sends control signals to open the switches MK1, MK2, and PK1 (step 310), thereby completing the power stop sequence. If for any reason the controller 28 fails to follow the above logic steps to shut down the power bus 16, the Time Delay Relay-Emergency (TDR-EMG) will open all of the switches listed above that should have been opened in steps 306 and 310.

Automatic Engine Stop/Start (AESS) Logic

Figure 7:
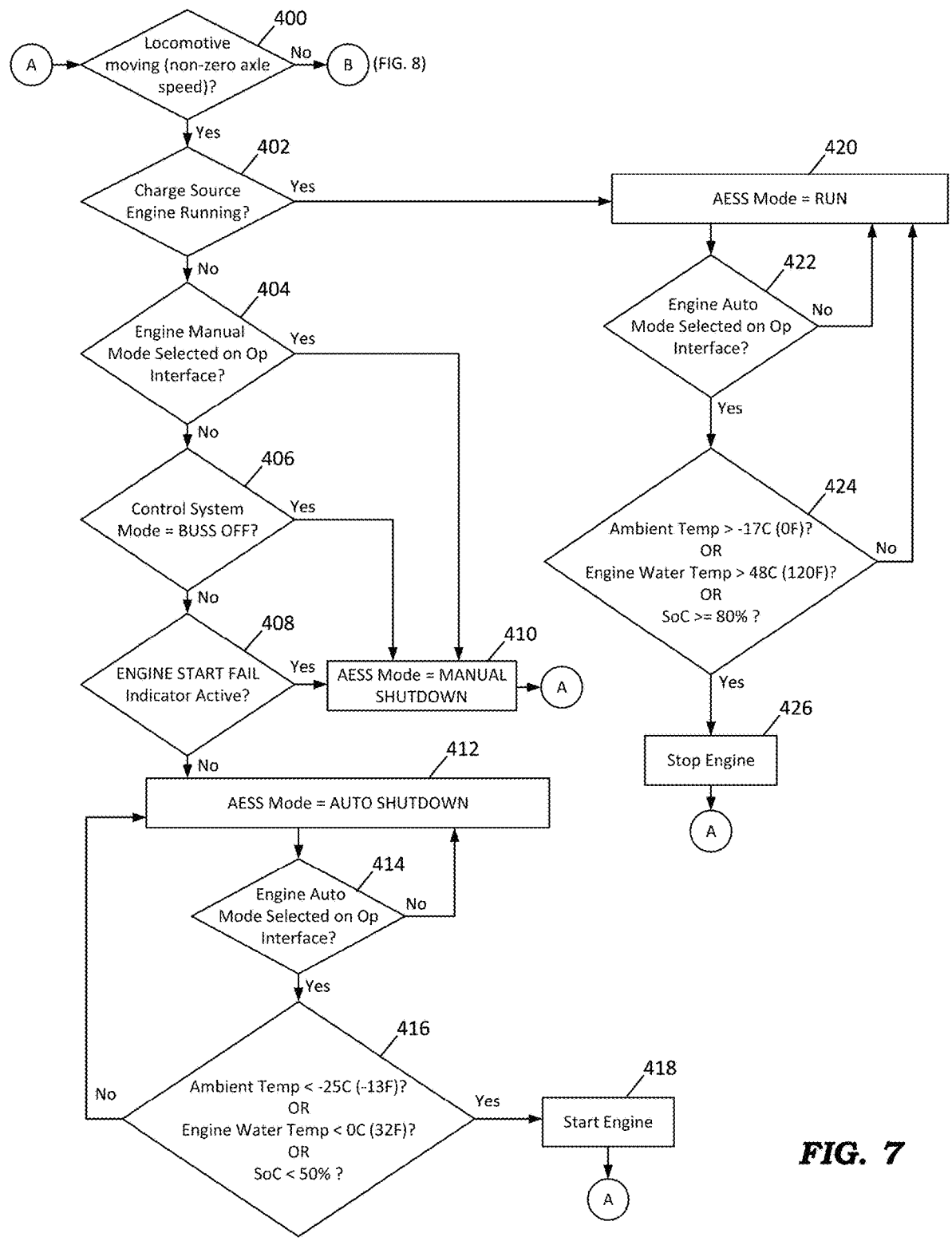
FIG. 7 is a flow diagram of an automatic engine stop/start process according to a preferred embodiment of the battery powered locomotive.
Figure 8:
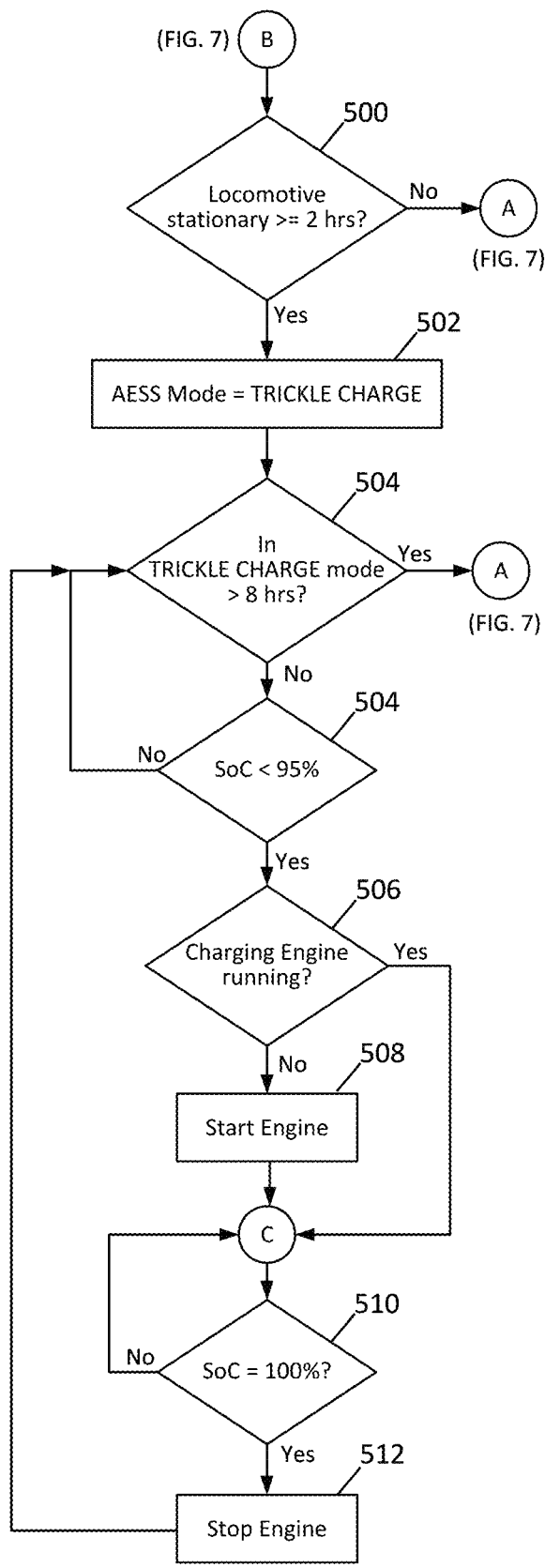
FIG. 8 is a flow diagram of a battery trickle charge process according to a preferred embodiment of the battery powered locomotive.

With reference to FIG. 7, if the locomotive is not moving (axle speed sensor 40 reads zero)(step 400), the trickle charge logic shown in FIG. 8 applies. Otherwise, the locomotive 10 is considered to be "in operation," in which case the AESS mode is determined by the first of the following conditions that apply. If the charging source engine 12 is running (step 402), the AESS is held in RUN mode (step 420). If engine manual mode is selected using the operator interface 32 (step 404), the AESS is held in MANUAL SHUTDOWN mode (step 410). If the control system is in BUS OFF mode (step 406), the AESS is held in MANUAL SHUTDOWN mode (step 410). If the ENGINE START FAIL indication is active (step 408), the AESS is held in MANUAL SHUTDOWN mode (step 410). If none of the above conditions apply in steps 402-408, the AESS is held in AUTO SHUTDOWN mode (step 412).

When the AESS is in RUN mode (step 420) and engine auto mode is selected (the default setting) using the operator interface 32 (step 422), any of the conditions set forth in step 424 will cause the charging source engine 12 to shut down. Accordingly, if the ambient temperature sensor 34 reading is greater than −17 degrees C. (0 degrees F.), or if the engine coolant water temperature sensor 36 reading is greater than 48 degrees C. (120 degrees F.), or if a state of charge (SoC) reading from the battery management systems 44 is greater than 80% in motoring mode, the charging source engine 12 will shut down (step 426). If none of the conditions in step 424 are true, the charging source engine 12 continues to run.

When the AESS is in AUTO SHUTDOWN mode (step 412) and engine auto mode is selected (the default setting) using the operator interface 32 (step 414), any of the conditions set forth in step 416 will cause the charging source engine 12 to start (step 418). Accordingly, if the ambient temperature sensor 34 reading is less than −25 degrees C. (−13 degrees F.), or if the engine coolant water temperature sensor 36 reading is less than 0 degrees C. (32 degrees F.), or if a state of charge (SoC) reading from the battery management systems 44 is less than 50% in motoring mode, the charging source engine 12 will start (step 418).

It should be noted that when engine manual mode is selected using the operator interface 32, the AESS will not trigger an automatic engine start or stop.

Trickle Charme Logic

According to the preferred embodiment, trickle charging mode is activated if the locomotive 10 will be stationary for an extended duration of time. The length of time that trickle charging mode is active is user adjustable. Generally, if the SoC percentages of the batteries 14 drop to less than 80%, the charging source engine 12 will be activated to top off the batteries 14 to be prepared for the next trip. While in trickle charging mode, there will be zero voltage at the armature windings 34 and the field windings 36 of the traction motors 20.

As noted above, if the locomotive 10 is not moving (axle speed sensor 40 reads zero)(step 400 in FIG. 7), the trickle charge logic shown in FIG. 8 applies. If the locomotive 10 has been stationary for at least two hours (step 500), the AESS will switch to TRICKLE CHARGE mode (step 502) for a maximum of eight hours (step 504). While in TRICKLE CHARGE mode, if any SoC reading from the battery management systems 44 is less than 95% (step 504) and the charging engine 12 is not running (step 506), the charging source engine 12 will start (step 508). Once all SoC readings from the battery management systems 44 reach 100% (step 510), the charging source engine 12 will stop (step 512). Once eight hours have elapsed since entering TRICKLE CHARGE mode (step 504), the process loops back to the AESS logic flow depicted in FIG. 7.

Accordingly, the present device advantageously provides a battery powered locomotive not having a prime mover engine. This yields improved fuel economy, reduced emissions, and lower operational costs.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A locomotive, comprising:
   a power bus operable to provide power to components of the locomotive when the locomotive is operating in a motoring mode or a charging mode;
   a plurality of batteries connected to the power bus, the plurality of batteries operable to provide power to the power bus when the locomotive is operating in the motoring mode, and operable to receive power from the power bus when the locomotive is operating in the charging mode, wherein a status of the plurality of batteries is indicated by a state of charge of one or more of the plurality of batteries;
   one or more traction motors connected to the power bus, the one or more traction motors operable to receive power from the power bus when the locomotive is operating in the motoring mode; and
   a charging source connected to the power bus, the charging source operable to intermittently provide charging power to the power bus to charge the plurality of batteries when the locomotive is operating in the motoring mode or in the charging mode, wherein the charging source is selectively activated and deactivated based at least in part on the state of charge of one or more of the plurality of batteries.

2. The locomotive of claim 1, further comprising:
   the power bus further operable to provide power to components of the locomotive when the locomotive is operating in a dynamic braking mode;
   the one or more traction motors further operable to provide charging power to the power bus when the locomotive is operating in the dynamic braking mode;
   the plurality of batteries further operable to receive charging power from the power bus when the locomotive is operating in the dynamic braking mode; and
   a power dissipation device selectively connected across the power bus, the power dissipation device operable to receive and dissipate excess power from the power bus when the locomotive is operating in the dynamic braking mode.

3. The locomotive of claim 1 wherein the charging source further comprises a generator powered by an engine that is operable to be started or stopped based on the state of charge of one or more of the plurality of batteries.

4. The locomotive of claim 1 wherein the charging source further comprises a hydrogen fuel cell that is operable to be started up or shut down based on the state of charge of one or more of the plurality of batteries.

5. The locomotive of claim 1, further comprising a controller that:
   receives a state of charge indication that indicates the state of charge of one or more of the plurality of batteries;
   generates a first control signal to activate the charging source based on the state of charge indication being less than or equal to a first state of charge threshold when the locomotive is operating in the motoring mode; and
   generates a second control signal to deactivate the charging source based on the state of charge indication being greater than or equal to a second state of charge threshold when the locomotive is operating in the motoring mode,
   wherein the second state of charge threshold is greater than the first state of charge threshold.

6. The locomotive of claim 5, wherein the controller:
   generates a third control signal to activate the charging source based on the state of charge indication being less than or equal to a third state of charge threshold when the locomotive is operating in the charging mode; and
   generates a fourth control signal to deactivate the charging source based on the state of charge indication being greater than or equal to a fourth state of charge threshold when the locomotive is operating in the charging mode,
   wherein the third state of charge threshold is greater than the first state of charge threshold, and the fourth state of charge threshold is greater than the second state of charge threshold.

7. The locomotive of claim 5, wherein the first state of charge threshold is 50% and the second state of charge threshold is 80%.

8. The locomotive of claim 6, wherein the third state of charge threshold is 95% and the fourth state of charge threshold is 100%.

9. The locomotive of claim 1, wherein the locomotive transitions from operating in the motoring mode to operating in the charging mode based on:
   an axle speed of the locomotive changing from non-zero to zero; and
   the axle speed of the locomotive remaining at zero for at least a first threshold time.

10. The locomotive of claim 1, wherein a ratio of traction motor mechanical power provided by the one or more traction motors to the charging power of the charging source ranges from about 4:1 to 5:1.

11. The locomotive of claim 10, wherein the traction motor mechanical power is 3200 horsepower (2386 kilowatts), the charging power is 804 horsepower (600 kilowatts), and the ratio of traction motor mechanical power to the charging power is about 4:1.

12. The locomotive of claim 1, wherein no charging power is provided to the power bus from a power source that is external to the locomotive when the locomotive is operating in the motoring mode or when the locomotive is operating in the charging mode.

13. A locomotive, comprising:
   a power bus operable to provide power to components of the locomotive when the locomotive is operating in a motoring mode or a charging mode;
   a plurality of batteries connected to the power bus, the plurality of batteries operable to provide power to the power bus when the locomotive is operating in the motoring mode, and operable to receive power from the power bus when the locomotive is operating in the charging mode;
   one or more traction motors connected to the power bus, the one or more traction motors operable to receive electrical power from the power bus and to provide traction motor mechanical power to axles of the locomotive to cause movement of the locomotive in the motoring mode; and
   a charging source connected to the power bus, the charging source operable to intermittently provide charging power to the power bus to charge the plurality of batteries when the locomotive is operating in the motoring mode,
   wherein a ratio of the traction motor mechanical power to the charging power ranges from about 4:1 to 5:1.

14. The locomotive of claim 13, wherein the traction motor mechanical power is 3200 horsepower (2386 kilowatts), the charging power is 804 horsepower (600 kilowatts), and the ratio of traction motor mechanical power to the charging power is about 4:1.

15. The locomotive of claim 13, wherein the charging source is selectively activated and deactivated based at least in part on a state of charge of one or more of the plurality of batteries.

16. The locomotive of claim 13, wherein no charging power is provided to the power bus from a power source that is external to the locomotive when the locomotive is operating in the motoring mode or when the locomotive is operating in the charging mode.

17. A locomotive, comprising:
- a power bus operable to provide power to components of the locomotive when the locomotive is operating in a motoring mode or a charging mode;
- a plurality of batteries connected to the power bus, the plurality of batteries operable to provide power to the power bus when the locomotive is operating in the motoring mode, and operable to receive power from the power bus when the locomotive is operating in the charging mode;
- one or more traction motors connected to the power bus, the one or more traction motors operable to receive electrical power from the power bus and to provide traction motor mechanical power to axles of the locomotive to cause movement of the locomotive in the motoring mode; and
- a charging source disposed within the locomotive and connected to the power bus, the charging source operable to intermittently provide charging power to the power bus to charge the plurality of batteries when the locomotive is operating in the motoring mode and when the locomotive is operating in the charging mode,
- wherein no charging power is provided to the power bus from a power source that is external to the locomotive when the locomotive is operating in the motoring mode or when the locomotive is operating in the charging mode.

18. The locomotive of claim 17, wherein the charging source is selectively activated and deactivated based at least in part on a state of charge of one or more of the plurality of batteries.

19. The locomotive of claim 17, wherein a ratio of traction motor mechanical power provided by the one or more traction motors to the charging power of the charging source ranges from about 4:1 to 5:1.

20. The locomotive of claim 19, wherein the traction motor mechanical power is 3200 horsepower (2386 kilowatts), the charging power is 804 horsepower (600 kilowatts), and the ratio of traction motor mechanical power to the charging power is about 4:1.

* * * * *